Van Vleck & Tupper,
Hose Coupling.
Nº 25,065. Patented Aug. 9, 1859.

Witnesses
Joseph Van Vleck
Geo. S. Hamilton

Inventor
George H. Van Vleck
Horace Tupper

UNITED STATES PATENT OFFICE.

G. H. VAN VLECK AND H. TUPPER, OF BUFFALO, NEW YORK.

HOSE-COUPLING.

Specification of Letters Patent No. 25,065, dated August 9, 1859.

*To all whom it may concern:*

Be it known that we, GEORGE H. VAN VLECK and HORACE TUPPER, both of Buffalo, in the county of Erie and State of New York, have invented a new and Improved Hose-Coupling; and we do hereby declare that the following is a full, clear, and exact description of the same, reference being had to the accompanying drawing, forming a part of this specification, in which—

Figure 3:
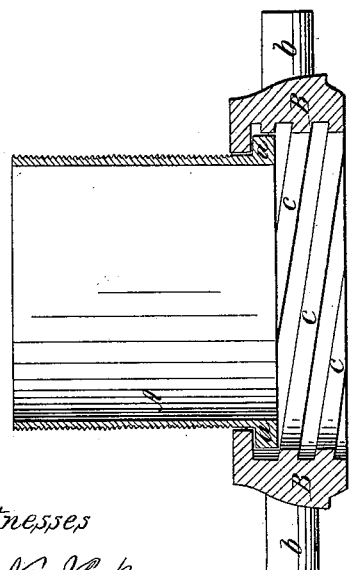
Figure 4:
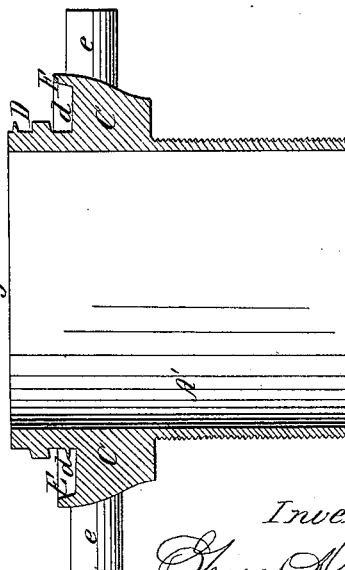
Figure 1:
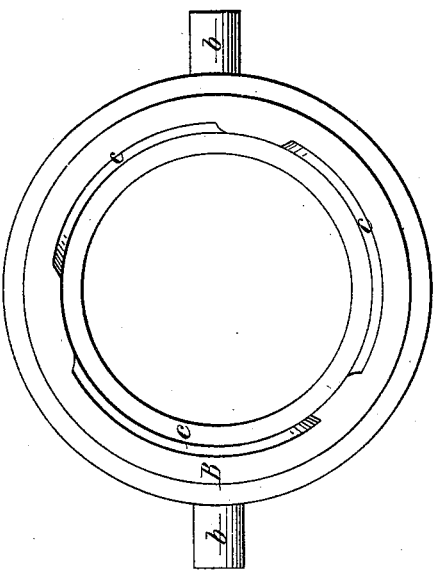
Figure 2:
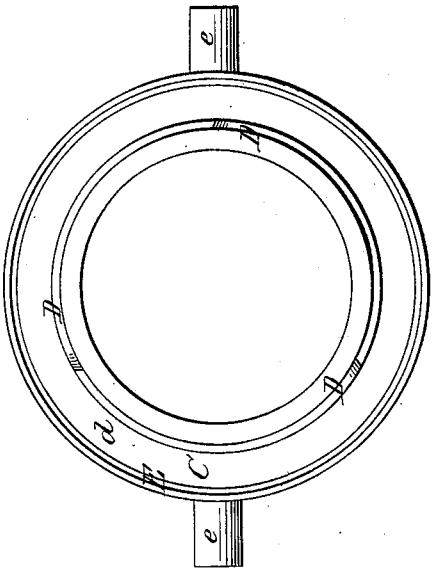

Figure 1 represents a vertical central section of the female part of our invention. Fig. 2 is a similar section of the male part. Fig. 3 is a plan or top view of the female part. Fig. 4 is a similar view of the male part.

Similar letters of reference in all the figures indicate corresponding parts.

A simple and efficient hose coupling, that is, one that can be "set up" quick and easy, as well when the water is on as when it is shut off, and so as to make a water-tight joint, has long been a desideratum.

Such a coupling is the object of our invention, which consists in arranging at the ends of the thimbles, to which the hose is fastened, a male and a female screw with two or more threads, the female part of the screw being placed loosely over one of the thimbles so that it can be turned independent from the hose, and the male part, which is cast out of one piece with the other thimble, being protected by an additional rim, which, at the same time, assists in making the joint tight. The uniting of the two halves is also facilitated by arranging the male part of the screw so that it enters a certain distance into the female part before it is turned.

To enable those skilled in the art to make and use our invention we will proceed to describe it.

A, A' are two thimbles or short pieces of pipe to which the ends of the hose are fastened in the usual manner. One of these thimbles, A, is provided with a shoulder, *a*, that serves to retain a female screw or nut, B, which is provided with two studs, *b*, to facilitate its turning. The inside of this nut is furnished with a triple screw thread, *o*, and its end is chamfered off so as to make a good fit with the other half of the coupling. The other half consists of the thimble, A', to the end of which there is cast a head, C, forming the male part, D, of the screw, and a projecting rim, E, that forms a groove, *d*, fitting over the chamfered end of the female nut, B. The head, C, is furnished with two studs, *e*, similar to the studs, *b*, on the nut, B, which serve to hold the head, C, and thimble, A', while the other half of the coupling is being screwed on.

The screw thread on the screw, D, corresponds to the thread in the nut, B, and it does not extend up to the edge of the same, said edge being turned down so as to fit into the female part, B, so that the male part enters a little before it screws into the female part. This arrangement obviates the difficulty which otherwise would be attended with the use of double or triple screw threads, it always being difficult to get such threads to catch properly if the same extend up to the edge on both the male and the female parts.

By using a double or triple thread on the screws one turn or even a portion of a turn may be sufficient to lock the coupling, and the thread on the male part being protected from bruising by the rim, E, is always kept intact and fit to catch into the thread of the female part without any loss of time so that the coupling can be "set up" and the joint completed when the water is on as well as when the water is shut off.

With ordinary screw couplings the end of the thread is unprotected, and they get bruised very easily, causing a great deal of inconvenience and trouble, and on account of the small pitch and many turns required by such couplings it takes a very long time to "set them up," whereby their practical value is greatly impaired. By turning down the edge of the male screw whereby the same is provided with a guide, the use of double, or triple threads has been rendered practicable and the rim, E, protects the ends of the threads from bruising, so that our couplings can be "set up" under all circumstances with equal facility.

The number of threads on the screw may be increased, at pleasure, if it should be desirable to unite the two halves in a still shorter time.

We disclaim the use of screw couplings independent from our other improvements. But

Having thus fully described our invention what we claim as new, and desire to secure by Letters Patent, is:—

The arrangement on the thimble, A', of the head, C, with two or more screw threads, D, having its upper end turned down, as described, and being provided with a projecting rim, E, to operate in combination with the thimble, A, and with the nut, B, substantially as and for the purpose set forth.

GEO. H. VAN VLECK.
HORACE TUPPER.

Witnesses:
CHAS. H. MURRAY,
H. B. BURT.